United States Patent
Shanthaveeraiah et al.

(10) Patent No.: US 7,200,646 B2
(45) Date of Patent: Apr. 3, 2007

(54) SYSTEM AND METHOD FOR ON-DEMAND NODE CREATION FOR FABRIC DEVICES

(75) Inventors: Sunil Shanthaveeraiah, Santa Clara, CA (US); Aseem Rastogi, San Jose, CA (US); Raghavendra Rao, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 998 days.

(21) Appl. No.: 09/842,495

(22) Filed: Apr. 25, 2001

(65) Prior Publication Data

US 2002/0161933 A1    Oct. 31, 2002

(51) Int. Cl.
*G06F 17/30* (2006.01)

(52) U.S. Cl. ............... 709/220; 709/203; 709/223; 709/227

(58) Field of Classification Search ............... 709/200, 709/213, 250, 218, 220, 222, 223, 224, 237, 709/230, 203, 202, 227; 707/10, 3, 100, 707/200–205; 370/360; 710/315, 305
See application file for complete search history.

(56) References Cited

U.S. PATENT DOCUMENTS

| | | | |
|---|---|---|---|
| 5,600,791 A * | 2/1997 | Carlson et al. ............ 714/47 |
| 5,805,924 A | 9/1998 | Stoevhase |
| 5,825,772 A | 10/1998 | Dobbins et al. |
| 5,872,932 A | 2/1999 | Schettler et al. |
| 5,941,972 A | 8/1999 | Hoese et al. |
| 5,944,798 A | 8/1999 | McCarty et al. |
| 5,959,994 A | 9/1999 | Boggs et al. |

(Continued)

FOREIGN PATENT DOCUMENTS

EP    989 490    3/2000

(Continued)

OTHER PUBLICATIONS

Khattar, et al., "Introduction to Storage Area Network, SAN," IBM, SG24-5470-00, International Technical Support Organization, Aug. 1999, 54 pages.

(Continued)

*Primary Examiner*—Cam-Y Truong
(74) *Attorney, Agent, or Firm*—Robert C. Kowert; Meyertons, Hood, Kivlin, Kowert & Goetzel, P.c.

(57) ABSTRACT

A fabric driver on a host system connected to a fabric may include an API for an administration application to query and obtain a list of devices connected to a fabric host adapter port(s). The fabric driver may execute this query and obtain the list of devices by querying a fabric name server. One or more direct attach devices may also be discovered. For direct attach devices, like private loop topologies, operating system device nodes may be created during driver attach. However, for fabric topologies the fabric driver provides a list of devices visible through the fabric host adapter port by querying the fabric name server and supplies this list to the administration application in response to the administration application's request. A user may then select devices from this list to be onlined. A dynamic persistent repository may be maintained of devices onlined using this on-demand node creation process.

53 Claims, 11 Drawing Sheets

U.S. PATENT DOCUMENTS

| | | | |
|---|---|---|---|
| 5,974,546 A | 10/1999 | Anderson | |
| 6,009,466 A | 12/1999 | Axberg et al. | |
| 6,016,144 A | 1/2000 | Blonstein et al. | |
| 6,182,167 B1* | 1/2001 | Basham et al. | 710/38 |
| 6,199,112 B1 | 3/2001 | Wilson | |
| 6,229,540 B1 | 5/2001 | Tonelli et al. | |
| 6,304,549 B1 | 10/2001 | Srinivasan et al. | |
| 6,311,232 B1 | 10/2001 | Cagle et al. | |
| 6,344,862 B1 | 2/2002 | Williams et al. | |
| 6,393,489 B1* | 5/2002 | Sambamurthy et al. | 709/250 |
| 6,421,711 B1 | 7/2002 | Blumenau et al. | |
| 6,446,141 B1* | 9/2002 | Nolan et al. | 710/8 |
| 6,449,734 B1 | 9/2002 | Shrivastava et al. | |
| 6,473,405 B2 | 10/2002 | Ricciulli | |
| 6,538,669 B1* | 3/2003 | Lagueux et al. | 345/764 |
| 6,584,499 B1* | 6/2003 | Jantz et al. | 709/220 |
| 6,594,698 B1* | 7/2003 | Chow et al. | 709/226 |
| 6,633,538 B1 | 10/2003 | Tanaka et al. | |
| 6,640,278 B1* | 10/2003 | Nolan et al. | 711/6 |
| 6,643,748 B1* | 11/2003 | Wieland | 711/152 |
| 6,654,752 B2 | 11/2003 | Ofek | |
| 6,654,830 B1* | 11/2003 | Taylor et al. | 710/74 |
| 6,665,714 B1* | 12/2003 | Blumenau et al. | 709/222 |
| 6,683,605 B1* | 1/2004 | Bi et al. | 345/211 |
| 6,687,766 B1 | 2/2004 | Caspter et al. | |
| 6,694,361 B1 | 2/2004 | Shah et al. | |
| 6,711,171 B1 | 3/2004 | Dobbins et al. | |
| 6,728,789 B2 | 4/2004 | Odenwald et al. | |
| 6,748,459 B1 | 6/2004 | Lin et al. | |
| 6,769,071 B1 | 7/2004 | Cheng et al. | |
| 6,772,207 B1 | 8/2004 | Dorn et al. | |
| 6,792,479 B2 | 9/2004 | Allen et al. | |
| 6,880,086 B2* | 4/2005 | Kidder et al. | 713/191 |
| 6,920,491 B2* | 7/2005 | Kim | 709/220 |
| 2001/0020254 A1* | 9/2001 | Blumenau et al. | 709/229 |
| 2001/0047482 A1 | 11/2001 | Harris et al. | |
| 2002/0161871 A1 | 10/2002 | Shanthaveeraiah et al. | |
| 2002/0161933 A1 | 10/2002 | Shanthaveeraiah et al. | |
| 2002/0188711 A1 | 12/2002 | Meyer et al. | |
| 2003/0023705 A1 | 1/2003 | Kim | |
| 2003/0217212 A1 | 11/2003 | Kim | |
| 2004/0015611 A1 | 1/2004 | Kim | |

FOREIGN PATENT DOCUMENTS

| | | |
|---|---|---|
| EP | 1 085 414 | 3/2001 |
| WO | 98/18306 | 5/1998 |
| WO | 01/14987 | 3/2001 |

OTHER PUBLICATIONS

"Open SANs, An In-Dept Brief," Version 1.1, Dec. 2000, 10 pages.

American National Standards Institute *for Information Technology* "Fibre Channel—General Services—3 (FC-GS-3)," ANSI NCITS 348-2001, 2001 Information Technology Industry Council, 261 pages.

American National Standards Institute *for Information Technology* "Fibre Channel—Switch Fabric (FC-SW)," ANSI NCITS 321-1998, 1998 Information Technology Industry Council, 108 pages.

American National Standards Institute *for Information Technology* "Fibre Channel Arbitrated Loop (FC-AL-2)," ANSI NCITS 332-1999, 1999 Information Technology Industry Council, 149 pages.

American National Standards Institute *for Information Technology* "Fibre Channel—Arbitrated Loop (FC-AL)," ANSI X3.272-1996, 1996 Information Technology Industry Council, 102 pages.

American National Standards Institute *for Information Technology* "Fibre Channel—Fabric Generic Requirements (FC-FG)," ANSI X3.289-1996, 1997 Information Technology Industry Council, 33 pages.

* cited by examiner

SYSTEM AND METHOD FOR ON-DEMAND NODE CREATION FOR FABRIC DEVICES

BACKGROUND OF THE INVENTION

1. Field of the Invention

This invention relates to discovery of devices attached to a fabric in a storage network.

2. Description of the Related Art

Storage area networks, also referred to as SANs, are dedicated networks that connect one or more systems to storage devices and subsystems. Today, fibre channel is one of the leading technologies for SANs. In general, fibre channel encompasses three networking topologies: point-to-point, loop, and fabric. In a point-to-point topology, a fibre channel host adapter in a system is typically connected to a single fibre channel storage subsystem. In a fibre channel loop network, also called an arbitrated loop, the loop is constructed by connecting nodes together in a single logical ring. Loops can be constructed by connecting nodes through a fibre channel hub in a star-wired topology or by connecting them together in a connected physical loop from node to node. In a fibre channel fabric topology, the storage networks are constructed with network switches. A fabric can be composed of a single switch or multiple switches. Ports on fabric networks connect nodes to switches on low-latency, point-to-point connections.

The nodes connected in the loop and fabric topologies refer to "network nodes" and can be any entity that is able to send or receive transmissions in a fibre channel network. For example, a node can be a computer system, a storage device/subsystem, a storage router/bridge that connects SCSI equipment, a printer, a scanner, or any other equipment, such as data capture equipment. The ANSI X3.272-1996 specification entitled "FC-AL, Fibre Channel Arbitrated Loop" and the ANSI X3.T11 Project 1133-D specification entitled "FC-AL-2, Fibre Channel Arbitrated Loop" describe examples of fibre channel loop topologies in further detail. The ANSI X3.T11 Project 959-D specification entitled "FC-SW Fibre Channel Switch Fabric" describes an example of a fibre channel fabric in further detail. Note that the most recent versions of these and related specifications may be obtained from the T11 technical committee of the National Committee for Information Technology Standards (NCITS).

For point-to-point topologies and loop topologies, device drivers executing on a host computer perform device discovery at host boot-up to determine locally connected devices. The discovered devices are configured to be accessible to applications running on the host by creating a node for each device within the host. These types of nodes are referred to as operating system device nodes. Each node functions as an internal (to the host) representation of an attached device and provides a communication path to the device. Since the number of devices attached to a host in point-to-point and loop topologies are limited, the discovery process may be completed within an acceptable time frame. Due to the number of devices capable of being attached to a fabric, discovering all fabric devices available to the host at host boot-up may not be feasible. Additionally, a host computer may desire to maintain its fabric device configuration across reboots and adjust for changes in the fabric.

SUMMARY OF THE INVENTION

Methods, systems, and programs for discovering devices in a storage network are described for various embodiments of the present invention. A host system may receive a request to identify available devices within a storage network. The host system may request the storage network to identify devices within the storage network that are available to the host system and may receive a list of available devices from the storage network. The host system may receive a request to on-line a subset of the devices within the storage network that are available to it and may create a node for each device within the subset. In one embodiment, a persistent repository may be updated to indicate the devices within the subset that have been on-lined.

In further embodiments, during a reboot process, a device discovery mechanism may determine for each of the I/O ports of a host system whether the I/O port is connected to one or more direct attach devices or to a fabric. For each of the I/O ports connected to one or more direct attach devices, the one or more direct attach devices are discovered and an operating system node is created for accessing each direct attach device. Each of the I/O ports connected to the fabric is designated as a fabric port without attempting to discover devices attached to the fabric. Subsequent to this reboot process, fabric devices may be on-line through an on-demand node creation process.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS OF THE INVENTION

Figure 1:
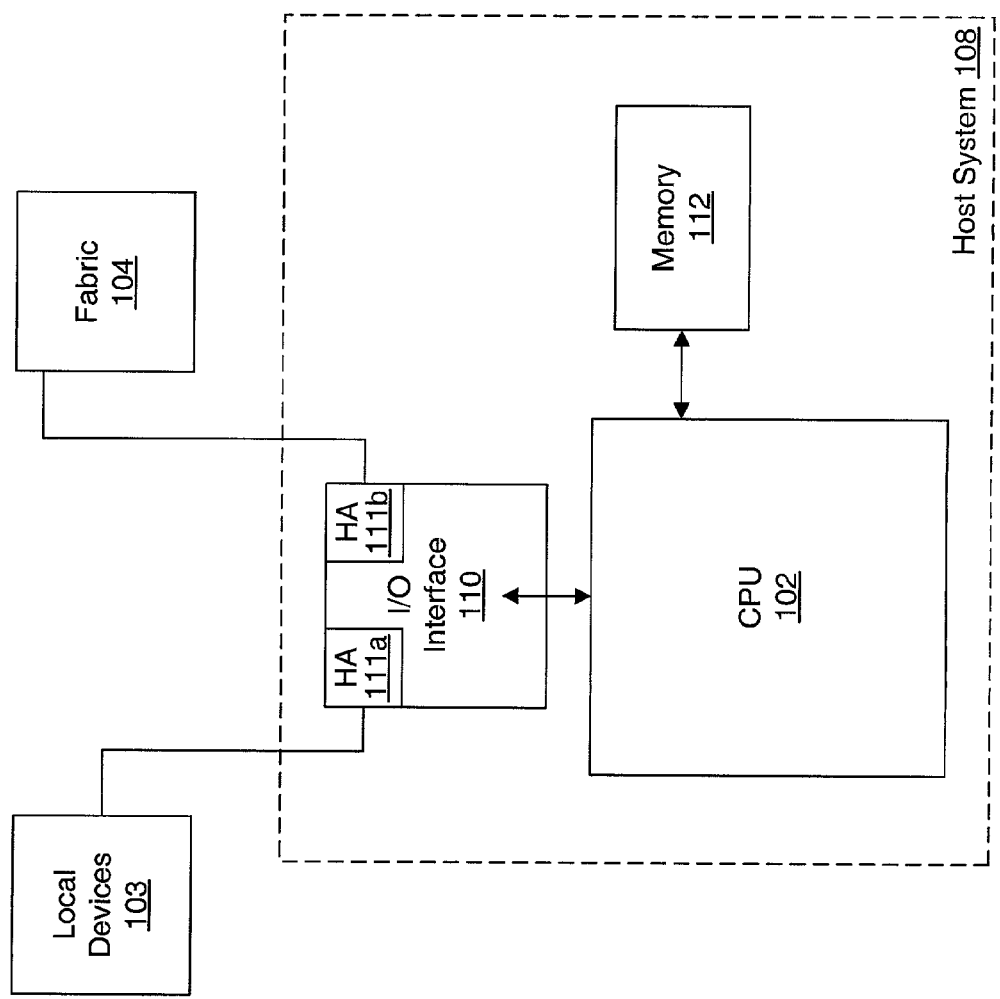
FIG. 1 illustrates a host computer attached to a fabric and one or more local devices.

FIG. 1 illustrates a host system 108 attached to a fabric 104, which is suitable for implementing various embodiments of the present invention. The host system 108 may include at least one central processing unit (CPU) or processor 102. The CPU 102 may be coupled to a memory 112. The memory 112 is representative of various types of possible memory media (also referred to as "computer readable media"): for example, hard disk storage, floppy disk storage, removable disk storage, flash memory or random access memory (RAM). The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive, or optical storage. The memory medium may include other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution.

As shown in FIG. 1 the memory 112 permits two-way access: it is readable and writable. The memory 112 may store instructions and/or data which implement all or part of the system and method described in detail herein, and the memory 112 may be utilized to install the instructions and/or data. In various embodiments, the host system 108 may take various forms, including a personal computer system, desktop computer, laptop computer, palmtop computer, mainframe computer system, workstation, network appliance, network computer, Internet appliance, personal digital assistant (PDA), embedded device, smart phone, television system, or other suitable device. In general, the term "computer system" may be broadly defined to encompass any device having a processor which executes instructions from a memory medium.

The host system 108 may be coupled to a fabric 104, which may provide access to a plurality of fabric attached devices, such as persistent storage devices or other computer peripheral devices. The CPU 102 may acquire instructions and/or data through an input/output interface 110. Through the input/output interface 110, the CPU 102 may also be coupled to one or more local devices 103, such as local input/output devices (video monitors or other displays, track balls, mice, keyboards, etc.) local storage devices (hard drives, optical storage devices, etc.), local printers, plotters, scanners, and any other type of local I/O devices for use with a host system 108. Some local devices may be referred to as direct attach devices. Input/output interface 110 may include host adapters 111a and 111b for coupling to local devices 103 and fabric 104 respectively. Host adapters 111a and 111b may be fibre channel adapters (FCAs). In one embodiment, one or more of the local devices may be included in the host system 108, such as in expansion slots of the host system 108. In one embodiment, one or more of the local devices may be externally connected to the host system 108.

The host system 108 may be operable to execute one or more computer programs. The computer programs may comprise operating system or other system software, application software, utility software, Java™ applets, and/or any other sequence of instructions. Typically, an operating system (OS) performs basic tasks such as recognizing input from the keyboard, sending output to the display screen, keeping track of files and directories on the disk, and controlling peripheral devices such as disk drives and printers. Application software runs on top of the operating system and provides additional functionality. In one embodiment, the OS may be based on Sun Microsystems's Solaris™ operating system. The computer programs may be stored in a memory medium or storage medium such as the memory 112, or they may be provided to the CPU 102 through the fabric 104 or I/O interface 110.

Figure 2:
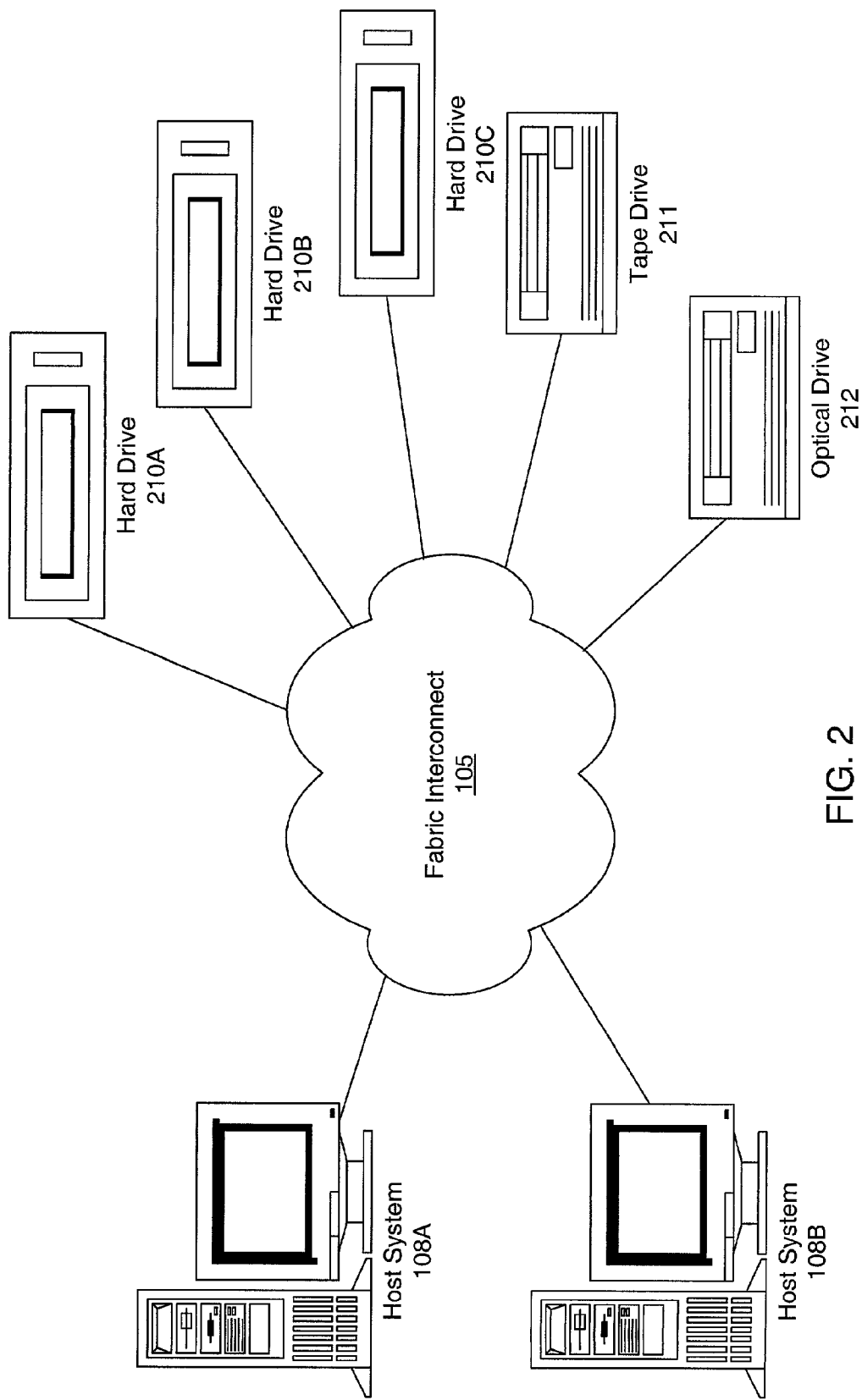
FIG. 2 illustrates an example of a storage area network (SAN) suitable for implementing various embodiments of the present invention.

FIG. 2 illustrates an example of a SAN coupled to host computers 108A and 108B. The SAN shown in FIG. 2 includes a fabric interconnect 105 coupled to hard drives 210A, 210B, and 210C, tape drive 211, and optical drive 212. Hard drives 210A, 210B, and 210C, tape drive 211, and optical drive 212 are also referred to as fabric devices. It should be noted that the number and types of hosts and devices shown in FIG. 2 are for illustration purposes only, and the actual number and types of hosts and/or devices in a SAN may vary. Fabric interconnect 105 may include one or more switches which are connected to the network nodes with an optical, copper cable, or other type of cable or interconnect medium.

Figure 4:
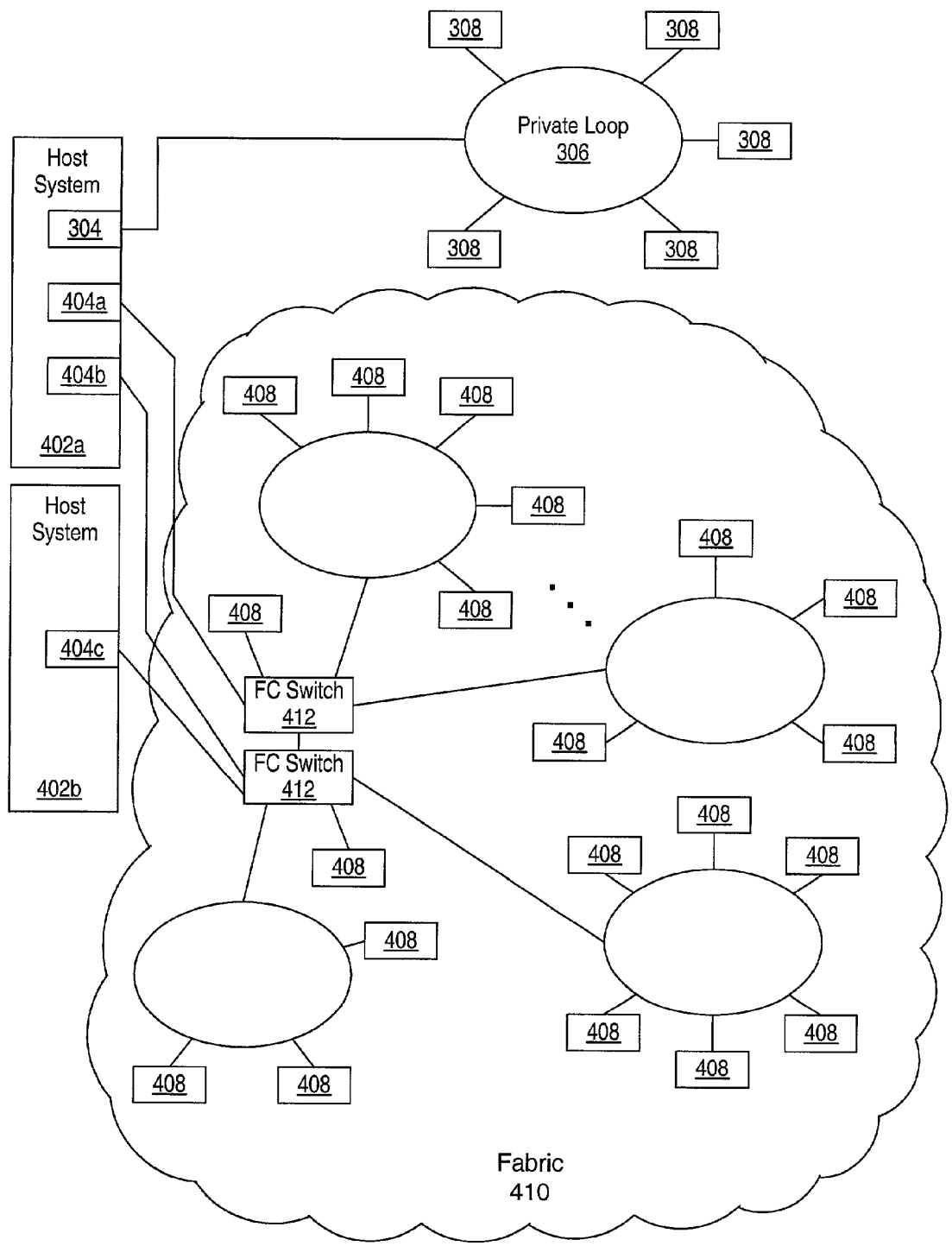
FIG. 4 illustrates an example of a storage network suitable for implementing various embodiments of the present invention.

FIG. 4 illustrates an example of a storage network which includes a direct attached private loop 306 and a fabric 410. It should be noted that storage networks may be configured in a variety of different ways and many include one or more direct attach devices, SANs, and/or network attach (NAS) devices. Furthermore, it should be noted that fabrics and/or SANs are not limited to fibre channel technologies and architectures but may include various types of technologies. For example, some or all of a SAN may be based on the InfiniBand™ Architecture or iSCSI (SCSI over IP).

Host adapter 304 couples host system 402a to private loop 306 and adapters 404a and 404b couples host system 402b to fabric 410. Note that host adapters 304, 404a and 404b may be separate host bus adapter cards, for example. In other embodiments, host adapters 304, 404a and 404b may each refer to a separate host adapter port. Coupled to private loop 306 are one or more direct attach devices 308. Direct attach device(s) 308 are considered local to host system 402a.

The host system 402b is coupled to fabric 410 via host adapter 404c. Fabric 410 includes fibre channel switches 412 which are coupled to multiple fabric devices 408. Each fibre channel switch may connect to various fibre channel topologies such as point-to-point fibre channel connections or fibre channel loops. Each switch may also connect to one or more other fibre channel switches. The fabric devices 408 may be various storage devices such as hard disk drives, optical drives, tape drives, etc. In some embodiments fabric devices 408 may be any type of I/O device such as storage devices, printers, scanners, etc. as are used in conjunction with computer systems.

Due to the large number of devices which may be present in fabric 410, the time required for a host system 402 to discover and online all of the devices available through fabric 410 may be impractical. Furthermore, it may be unlikely that host system 402 actually needs to communicate with all of the various fabric devices 408. The term "online"

may be used herein to refer to creating a node to provide a communication mechanism or path to a device.

Figure 5:
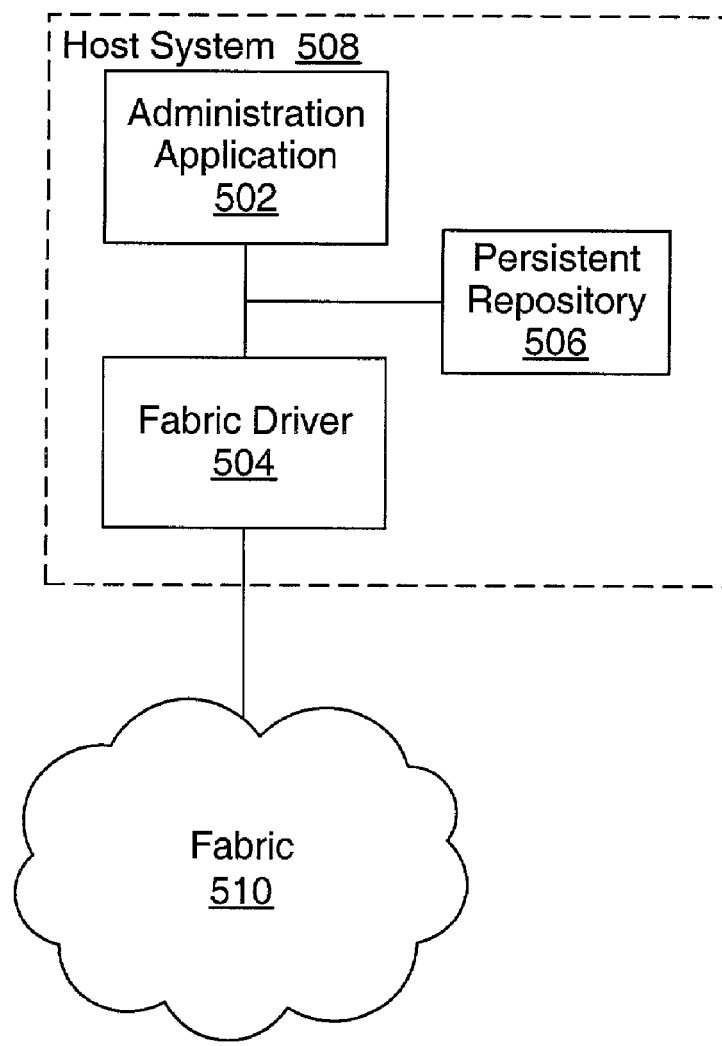
FIG. 5 is an illustration of a host computer coupled to a fabric according to one embodiment of the present invention.

FIG. 5 illustrates a host system 508 coupled to a fabric 510 according to one embodiment of the present invention. The fabric 510 may be implemented with one or more switches coupled to one or more storage devices or subsystems. Furthermore, it should be noted that fabric 510 is not limited fibre channel fabrics but my be extended to any type of switched storage network. A fabric driver 504 provides an interface between host system 508 and fabric 510. A persistent repository 506 is a data structure that stores information on the current status of the fabric devices. An administration application 502 is a software program running on host system 508 and accessible to a system administrator. Administration application 502 provides a mechanism for discovering fabric devices on-demand with user input thereby eliminating the need to discover all fabric devices accessible to a host system at one time. As such, nodes can be created only for selected fabric devices (i.e., a subset of available fabric devices) during a discovery process. It should be noted that if a node is already created for a selected fabric device, it may not be necessary to re-create the node.

During a discovery process, administration application 502 may query a fabric driver 504 for a list of devices visible to the host system 508. Fabric driver 504 provides an interface for the host system to the fabric. Fabric driver 504 may be part of the operating system for the host system and may include one or more modules for handling various functions required to interface the host system to the fabric such as protocol handling and transport layer operations. In one embodiment of the present invention, the fabric driver 504 may be a Solaris kernel module or modules. The fabric driver 504 may provide the requested list of devices to the administration application 502. A subset of these devices may then be selected through administration application 502 and brought online by fabric driver 504 so that the subset of devices are accessible from host system 508. Onlining the subset of devices may include the creation of a node within the operating system for each device wherein the node provides a reference for applications or other processes in host system 508 to reference a corresponding device in fabric 510. Thus, a node provides a path for an application or process running on the host system to communicate with one of the fabric devices. Thus, when a fabric device is onlined, a communication path may be established between the host system 508 and the discovered fabric device.

Administration application 502 thus provides a mechanism to select and online only a subset of the visible fabric devices. Also administration application 502 may be run outside of the boot process so that device discovery and online operations do not increase the host system boot time. The administration application 502 may be run on-demand so that fabric devices may be selected and brought online on demand. For one embodiment of the present invention, a system administrator may use administration application 502 to request a list of fabric devices available through one or more host adapter I/O ports of host system 508. Administration application 502 may include a command line interface or a graphical user interface (or both) for displaying the list to the system administrator. Through this interface the system administrator may then select a desired subset of the listed devices and request that the selected devices be brought online.

The fabric driver 504 provides APIs for the administration application 502 to make queries in order to obtain a list of devices connected to one or more host adapter ports. In one embodiment a transport layer of the fabric driver 504 may execute the query irrespective of the interconnect topology of the host adapter ports. For example, the fabric driver may obtain the list of devices connected to a fibre channel switched fabric by querying a fabric name server. The fabric name server may be located within a fabric switch or distributed across the fabric switches and maintains information about the various fabric devices. The fabric name server may include a database of objects. Each fabric attached device may register or query useful information in the name server, including, name, address, class of service capability of other participants, etc. The fabric driver may also provide an API for obtaining a list of direct attach devices for a host. For example, the fabric driver may obtain the loop map for a host system's private loop topology.

For direct attach devices, e.g. private loop topologies, operating system device nodes may be created during driver attach (e.g., when the fabric driver is loaded during a reboot) for all devices visible through a direct attach port. In some embodiments, operating system device nodes are only created for direct attach devices that support a particular protocol (e.g., FCP/SCSI).

For fabric topologies connected to the host system 508, operating system device nodes may not be created until an on-demand request is made by the administration application 502. As discussed above, upon such a request from the administration application 502, the fabric driver 504 provides a list of devices visible through one or more fabric host adapter ports. The fabric driver 504 may obtain the list by accessing a fabric name server. The list of fabric devices may be provided by the administration application 502 to a system administrator, for example, through a graphical user interface. The system administrator may use the administration application 502 to select and online particular devices which are desired to be used by the host system 508. The administrator may also use administration application 502 to offline any devices which are no longer needed. Offlining may be removing access to a storage device form the host operating system by removing the node. The list of devices displayed to the administrator by the administration application 502 may include the information returned about the fabric devices by the fabric named server. The administration application 502 may request the fabric driver 504 to online or offline fabric devices as indicated by a system administrator using the application's user interface. In some embodiments, the administration application 502 may make requests to fabric driver 504 to obtain fabric device information and/or to online/offline fabric devices without the involvement of a system administrator. For example, certain events or requests from other processes may trigger administration application 504 to online a fabric device(s).

The persistent repository 506 may be stored in the host system 508, or in some central local accessible to host system 508, indicating the current fabric devices which have been onlined (e.g., devices for which an operating system device node has been created). The information stored in the persistent repository 506 may be used so that the configuration of devices online for the host system 508 persists across reboots and shutdowns. For example, when the host system 508 is rebooted the persistent repository may be read to determine which devices were online before the reboot and the fabric driver may be requested to online these same devices again.

The persistent repository 506 may be dynamically updated to reflect the state of the fabric devices. For example, if a fabric device which is currently online for the host system 508 is disabled on the fabric (for example, a hard drive fails or is removed from the fabric), fabric driver 504 may generate an event causing the persistent repository to be updated to reflect that the device is now offline. Similarly, if the same device later is restored on the fabric, the device may be onlined again (e.g. in response to an event) for the host system 508 and the persistent repository dynamically updated to reflect the onlined status.

Although fabric 510 may include an extremely large number of fabric devices, the query operations made by administration application 502 to obtain a list of the fabric devices may be made on a per host adapter port granularity or a set of host adapter ports granularity so that the number of devices returned by the query may be a manageable number.

Figure 6:
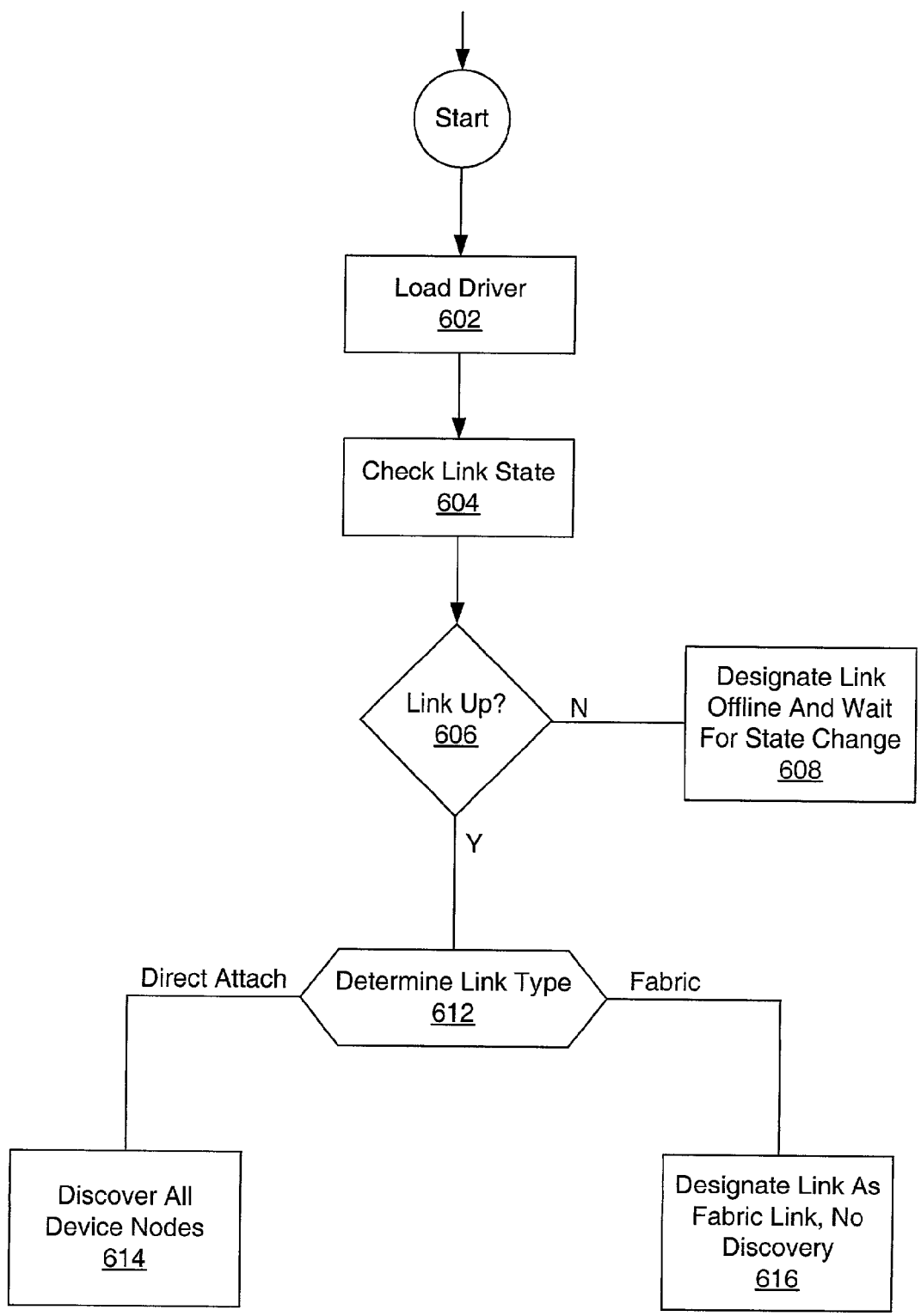
FIG. 6 is a flowchart illustrating a device discovery process, according to one embodiment of the present invention.

Turning now to FIG. 6, a flowchart is provided illustrating a device discovery process according to one embodiment of the present invention. The discovery process may be part of a host system reconfiguration boot process. Alternatively, if a non-reconfiguration boot is performed of the host system in which device discovery is not performed, the discovery process may run when a previously created device node is accessed in the host system. This discovery process may also be performed if the host system's host adapter link is lost (e.g. cable pulled out).

During the discovery process a fabric driver is loaded as indicated at 602. Note that if the fabric driver is already loaded, then it may no be necessary to load the fabric driver again. The link state of each host adapter port may be checked as indicated at 604 and 606. If a port's link is down, the link may be designated as offline as indicated at 608, and the discovery process for that link may wait for a state change in the link to online, as indicated at 610. If the link is later restored, the discovery process may continue for that link.

If the link is up, the link type is determined, as indicated at 612. In one embodiment, a fabric login is attempted through the link. If the fabric login is successful, the link is determined to be a fabric link. If unsuccessful the link is determined to be a direct attach link. For a direct attach link, the one or more direct attach devices are discovered and brought online by creating operating system device nodes for each direct attach device. If the link is a fabric link, the link is designated as such, but no device discovery or onlining of devices is performed for the fabric link as part of this discovery process, as indicated at 616. The discovery process as illustrated in FIG. 6 may be repeated any time a link goes out (e.g., cable pulled, power off, host reboot, etc.).

The device discovery process illustrated in FIG. 6 provides for the discovery and onlining of direct attach devices since the discovery and onlining of such devices may be completed quickly due to the limited number of such devices. However, for a host system's fabric links, device discovery is not performed as part of the normal discovery process performed at reconfiguration boot up or the first time a node is attempted to be accessed after a link has been down and brought back up. Instead, fabric devices may be discovered using the on-demand node creation process described herein.

Figure 3:
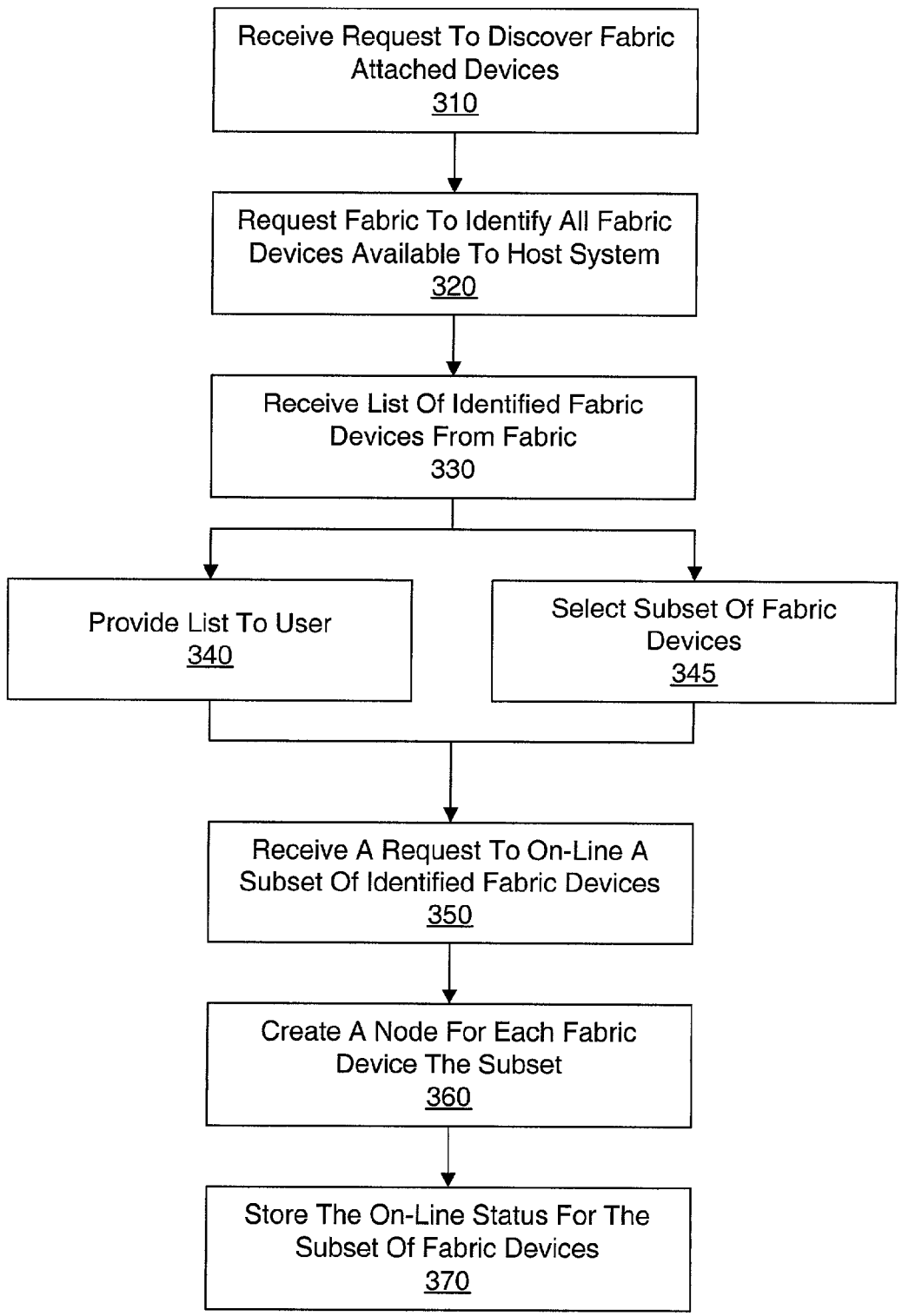
FIG. 3 is a flowchart illustrating an on-demand node creation process according to an embodiment of the present invention.

One embodiment of the on-demand node creation process is illustrated by the flowchart of FIG. 3. A request may be received to discover fabric attached devices, as indicated at 310. In response to the request to discover fabric attached devices, a fabric may be requested to identify fabric devices available to a host system, as indicated at 320. A list of identified fabric devices may be received from the fabric, as indicated at 330. Note that the term "list" simply refers to the information provided by the fabric driver and does not require any particular format.

This list may be provided to a user for selection of a subset of the fabric devices, as indicated at 340. Alternatively, selection of a subset of the fabric devices may be performed without user involvement, as indicated at 345. A request may be received to on-line the subset of identified fabric devices, as indicated at 350. In response to the request to on-line the subset of identified fabric devices, a node may be created for each fabric device of the subset not already on-line, as indicated at 360. The node provides a mechanism for processes to communicate with the corresponding device from the host system. The on-line status on each fabric device of the subset may be stored, as indicated at 370.

Figure 7:
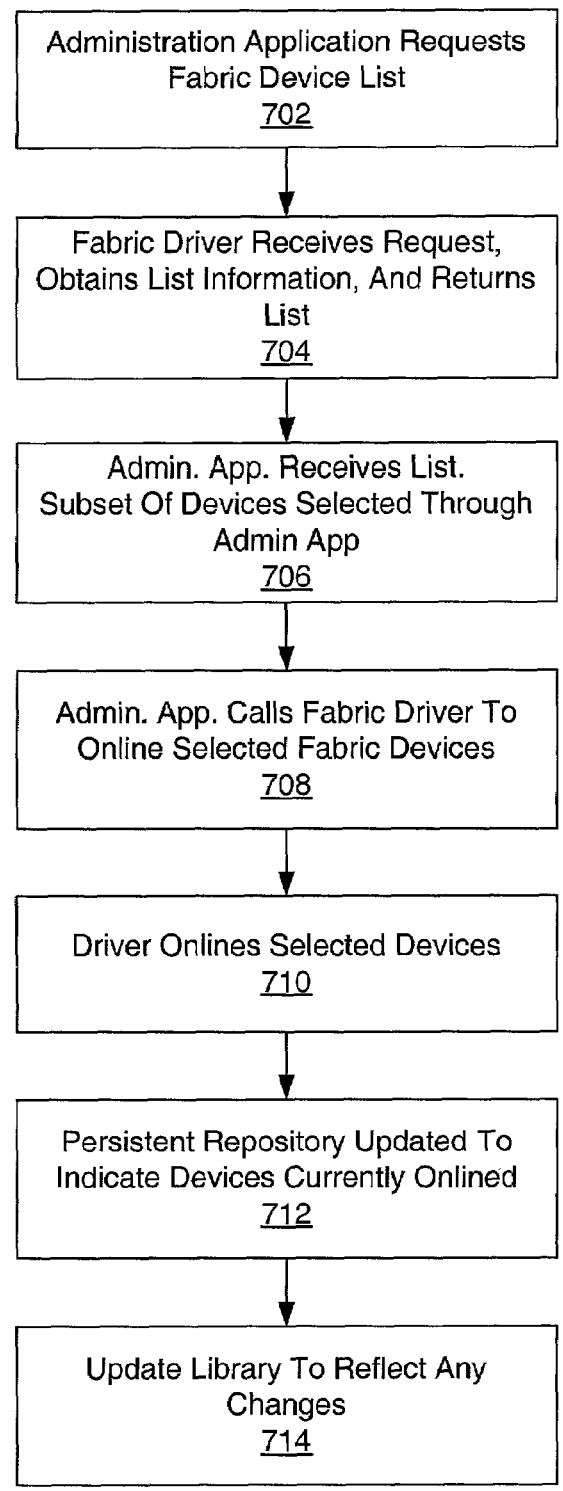
FIG. 7 is a flowchart illustrating an on-demand device node creation process, according to one embodiment of the present invention.

Another embodiment of the on-demand node creation process is illustrated by the flowchart of FIG. 7. An administration application may make a request for a list of fabric devices, as indicated at 702. This request may have been initiated by a system administrator using the administration application for the host system. In other embodiments, this process may be initiated automatically, for example in response to an event (e.g. fibre channel protocol event) or a request from another application or process. A fabric driver may receive the request from the administration application as indicated at 704. The fabric driver may access a fabric name server to obtain the requested information and return the requested list of fabric devices to the administration application. Note that the term "list" simply refers to the information provided by the fabric driver and does not require any particular format.

The administration application may receive the list and a subset of devices may be selected from the list, as indicated at 706. In one embodiment the list may be displayed through a graphical user interface to a system administrator. In other embodiments, a command line or textual user interface is used. The system administrator may select particular devices from the list to be onlined or offlined. The administration application may then call the fabric driver to online or offline devices as indicated by the selections made for the subset of devices from the list, as indicated at 708. The driver may then attempt to online the devices selected to be onlined (and may offline the devices selected to be offlined), as indicated at 710. Onlining a device may include the creation of an operating system device node for that device. The device node provides a mechanism for processes to communicate with the corresponding device from the host system.

A persistent repository may be updated (or created if not already existing) to indicate which devices are currently online, as indicated at 712. During operation, the persistent repository may be updated to reflect any changes in fabric devices. For example, if a device indicated by the persistent repository to be currently onlined is removed from the fabric the persistent repository may be updated accordingly as indicated at 714. Changes in the fabric may be detected by an event generated in the fabric and communicated to the administration application (or library) by the fabric driver.

Figure 8:
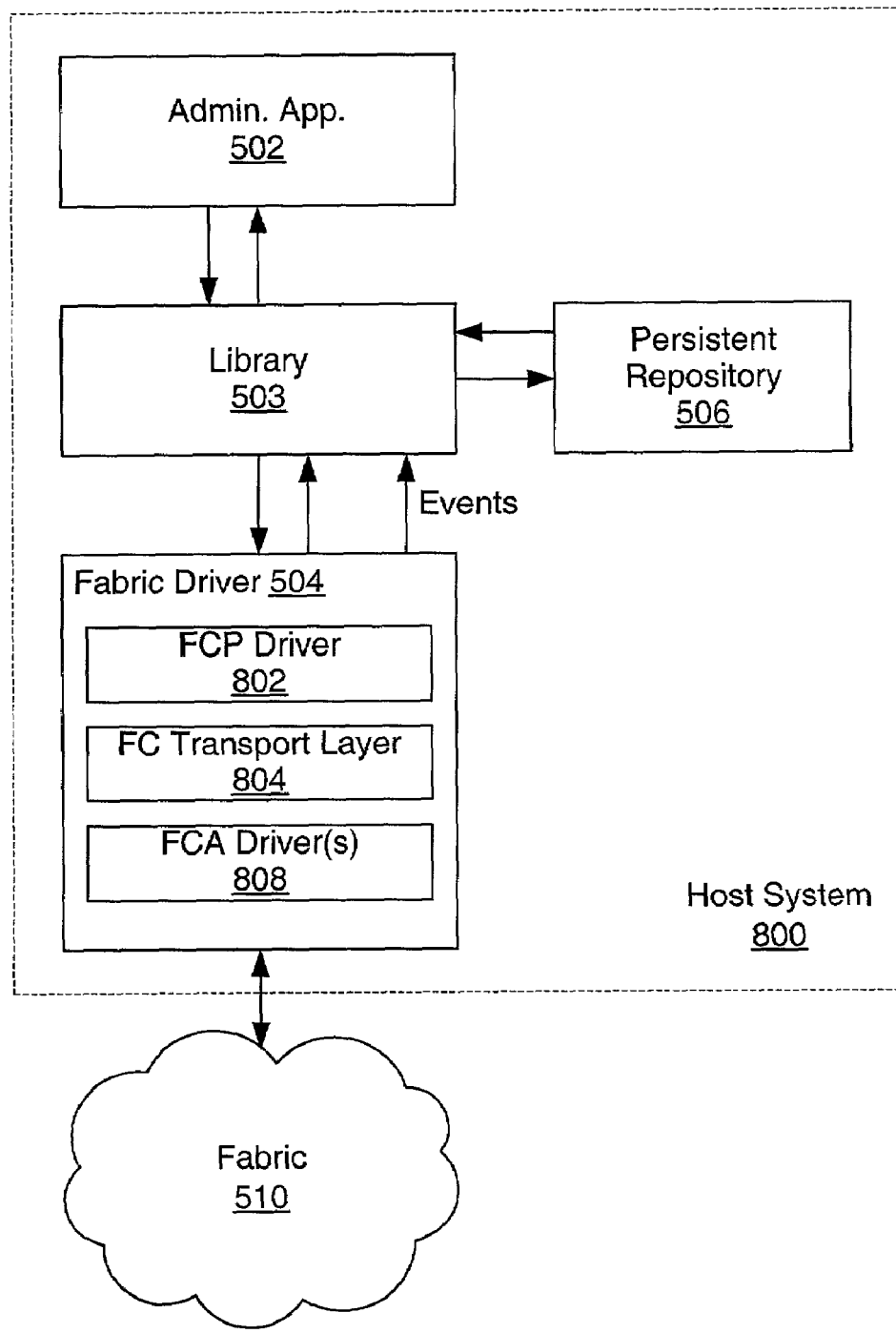
FIG. 8 is an illustration of a system coupled to a fabric according to an embodiment of the present invention.

FIG. 8 illustrates a host system 800 coupled to a fabric 510 according to one embodiment of the present invention. The host system 800 includes a fabric driver 504 for communicating with a fibre channel fabric. A library 503 may be provided as an interface between the administration application 502 and the fabric driver 504. The library may be made part of the operating system libraries and may be useable by other applications on the host system. For one embodiment of the present invention, fabric driver 504 may include various sub-modules. For example, in a fabric channel implementation, the fabric driver may include a fabric channel protocol driver module (FCP) 802. The FCP module may be part of the operating system kernel and may perform all protocol related operations required for fabric channel use on the host operating system. For example, FCP module 802 may be a SCSI over fiber channel encapsulation driver module for supporting SCSI over fiber channel. Driver 504 may also include a transport layer 804. This module may perform all generic fabric operations. In one embodiment transport layer 804 may include a fiber channel port (FP) driver for each fibre channel port on the host system. Each FP driver may also be part of the operating system kernel. The FP driver performs all generic fiber channel operations such as topology discovery (e.g., loop, point-to-point, fabric, etc.), device discovery (on various topologies), handling extended link services, handling link state changes, etc. The fabric driver 504 may also include host adapter drivers 808 for each host adapter/controller board on the host system. For example FCA drivers may be present for fiber channel adapters having fiber channel ports on the host system.

Figure 9:
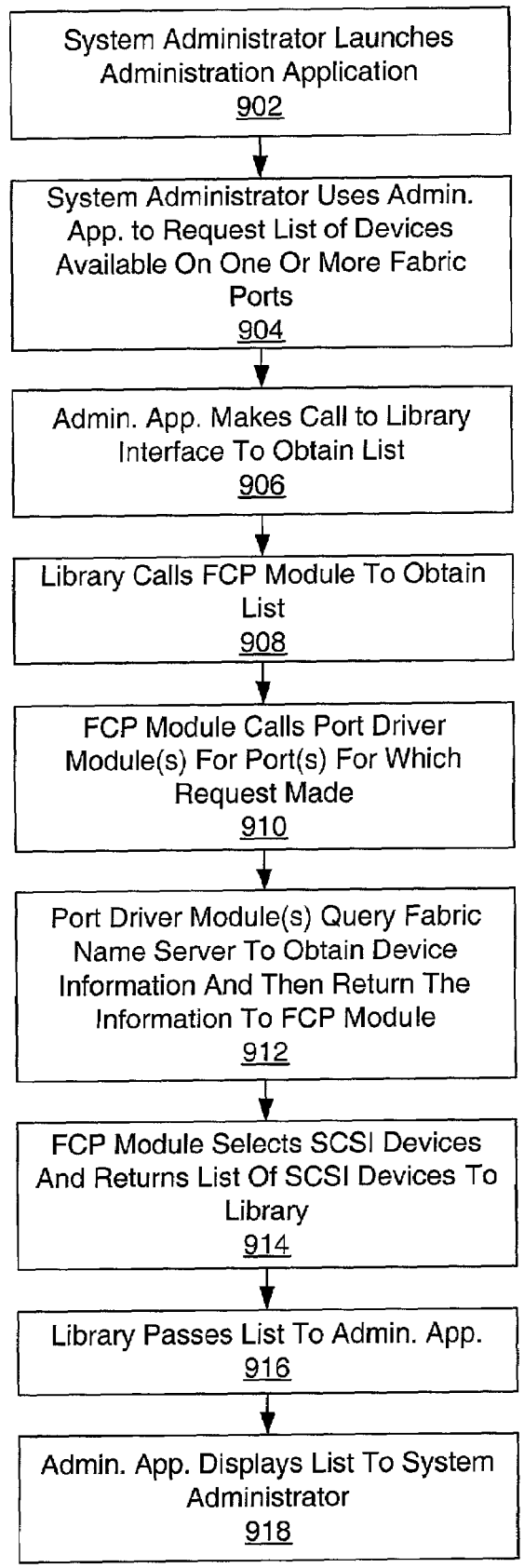
FIG. 9 is a flowchart of an on-demand node creation process for fibre channel fabrics according to an embodiment of the present invention.

FIG. 9 illustrates a more detailed flowchart of the on-demand node creation process for fibre channel host adapter ports of a host system. In one embodiment, the host system may be executing a UNIX type operating system such as the Solaris™ operating system from Sun Microsystems. A Solaris operating system and fibre channel fabric will be assumed by way of example in the following description.

A user (e.g. system administrator, other process, etc.) may launch or access the administration application to obtain a list of devices available on a fabric port (e.g. FCA port), as indicated at 902. For example, a system administrator may interface to the administration through a graphical user interface (GUI), command line use interface, etc. Through the user interface, the system administrator may query for devices available on a single port or on a set of ports, as indicated at 904. On Solaris, for example, an FCA port may have a file system representation of the form, e.g., /devices/pci@1f,0/pci@1/SUNW,qlc@4/fp@0,0:fc.

One or more library interfaces may be provided as an interface between the administration application and the fabric driver. This library interface(s) may be made part of the operating system's standard storage libraries. The administration application may then call one or more of the library interfaces to obtain the list of devices, as indicated at 906. These libraries may be shared between the administration application and other storage applications. The library calls into the fabric driver to obtain the list of devices, as indicated at 908.

In one embodiment, the library calls into an FCP module using the standard driver IOCTL interface (the call may actually be made into an FP module which merely passes on the IOCTL call to the FCP module) to obtain the list of devices. The library may then wait for the FCP module to return the list. The FCP module may then make a call into a port driver module(s) to obtain the list of fabric devices available through the fabric port(s) on which the request was made, as indicated at 910. For example, the FCP module may call an FP module(s) using the FC transport APIs between ULPs and the FC transport to obtain the list of fabric devices available through the FCA port(s) on which the request was made.

The fabric driver (e.g. port driver module(s) of the fabric driver) then obtains the device information from the fabric. In one embodiment, the FP module(s) may query a NameServer on the fabric (the Name Server may be maintained by FC switches) to obtain the list of FC ports and return this list to FCP, as indicated at 912.

In one embodiment, the fabric driver may check the list for devices following a particular protocol and return a list of those devices to the administration application library interface. For example, the FCP module may check for SCSI ports from the received list (e.g. disks and tapes) and return the list of SCSI capable FC ports to the library, as indicated at 914. In another embodiment, the list may include selective LUNs (logical units) behind an FC port. The library may then pass this list on to the administration application, as indicated at 916. The administration application may then display the list through its user interface, as indicated at 918.

Figure 10:
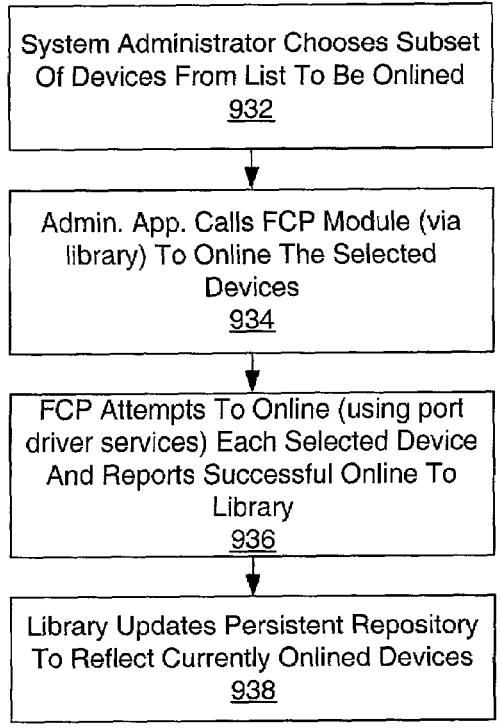
FIG. 10 is a flow chart illustrating a method for onlining selected fabric devices on-demand from a list of fabric devices, according to one embodiment of the present invention.

Turning now to FIG. 10, a flow chart is provided illustrating a method for onlining selected fabric devices on-demand from a list of fabric devices, according to one embodiment. In one embodiment, a list of fabric devices may have been obtained by the method illustrated in FIG. 9. A user (e.g. system administrator, other process, etc.) chooses a subset of devices from this list to online and passes this list of devices to the administration application, as indicated at 932. The administration application may then call the fabric driver to online the selected devices. For example, the administration application may call an FCP module (via a library interface) to online the selected devices, as indicated at 934. The FCP module, using the services of FP module(s), attempts to online each of the selected devices in the list and reports each successful online to the library, as indicated at 936. For every device successfully onlined by the FCP module, the administration application library interface updates a persistent repository to reflect devices currently onlined, as indicated at 938. Note also that offlining a node through the administration application may cause an event to be generated to trigger an update the persistent repository.

Figure 11:
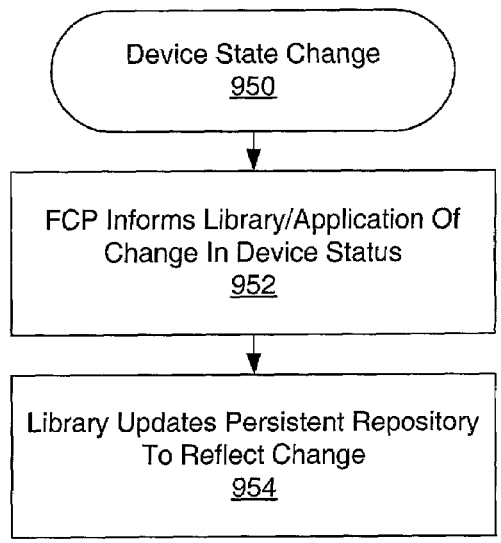
FIG. 11 is a flowchart illustrating a mechanism for dynamically updating a persistent repository to reflect a changes a in the fabric, according to one embodiment of the present invention.

Turning now to FIG. 11, one embodiment is illustrated of a mechanism for dynamically updating the persistent repository to reflect changes that occur in the fabric. A device state change may occur in the fabric, as indicated at 950. For example, a fabric disk drive online for the host system may be removed from the fabric. An event may be generated to indicate this change. The FCP module may inform the library/application of such changes that effect the device list, as indicated at 952. The administration application library interface may update the contents of the persistent repository in response to receiving notification of a change, as indicated at 954, so that the persistent repository is dynamically updated to reflect such changes. The persistent repository may be stored, for example, on persistent storage such as a disk drive or non-volatile memory.

Figure 12:
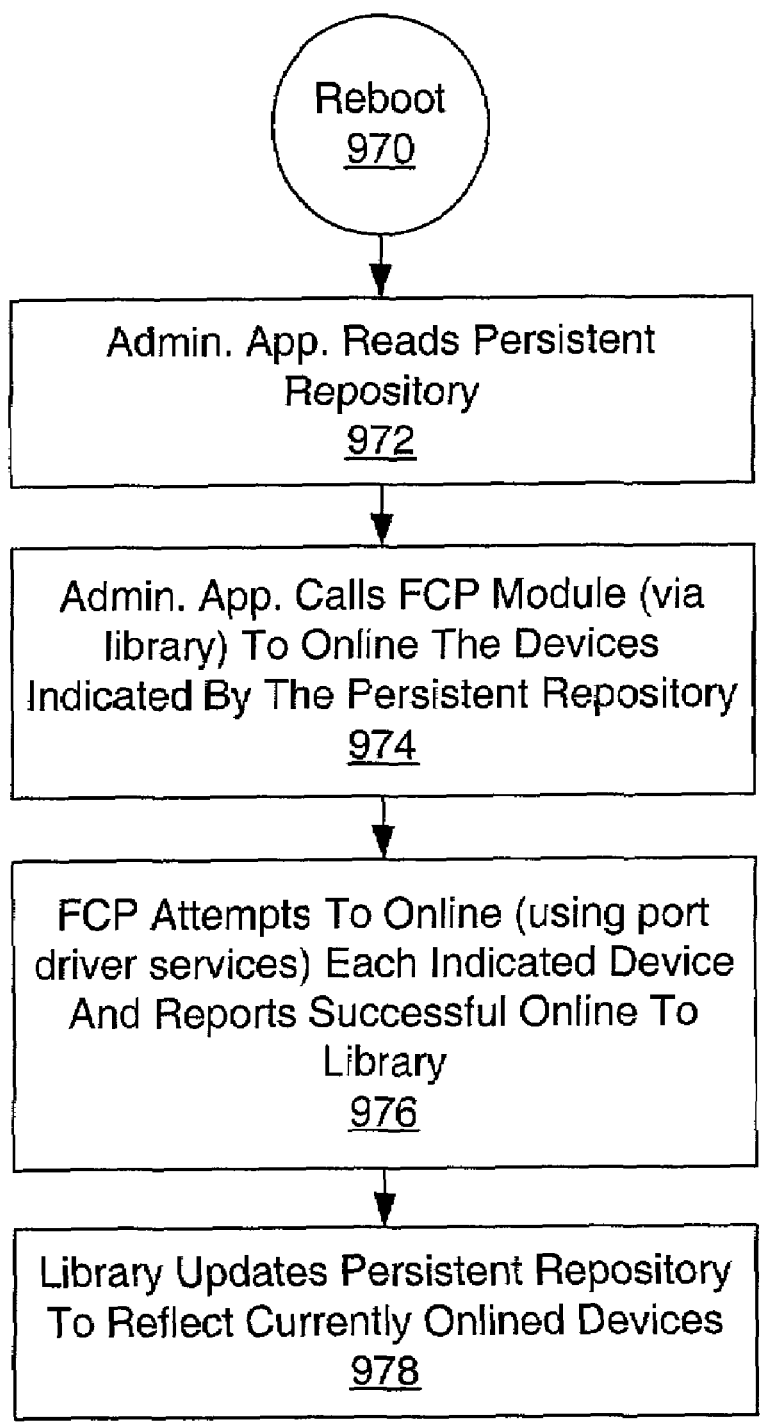
FIG. 12 is a flowchart illustrating a mechanism to allow a host's fabric device configuration to persist across reboots and shutdowns, according to one embodiment of the present invention.

The persistent repository may allow a host's fabric device configuration to persist across reboots and shutdowns, as illustrated in FIG. 12 for one embodiment. On a host reboot (970), a component of administration application (e.g. in the Solaris 'rc' scripts) reads the persistent repository to determine which devices were previously online, as indicated at 972. The administration application then calls the fabric driver (via the library) to online the fabric devices that were onlined prior to the reboot, as indicated at 974. The fabric driver attempts to online each device indicated by the persistent repository and reports successful onlines to the library, as indicated at 976. The library may then update the persistent repository to reflect the currently online devices, as indicated at 978.

An example of an entry in a persistent repository is: /devices/pci@1f,4000/pci@2/SUNW,qlc@4/fp@0,0:fc:: 50020f23000000e6. In this example, the entry identifies the /devices path to an onlined FC port. In other embodiments, additional information may be included. For example, the repository may identify onlined fabric devices on a per LUN basis.

Various modifications and changes may be made as would be obvious to a person skilled in the art having the benefit of this disclosure. Note also that the flow charts described herein do not necessary require a temporal order. It is intended that the following claims be interpreted to embrace all such modifications and changes and, accordingly, the specifications and drawings are to be regarded in an illustrative rather than a restrictive sense.

Various embodiments may further include receiving, sending or storing instructions and/or data implemented in accordance with the foregoing description upon a computer readable medium. Generally speaking, a computer readable medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

What is claimed is:

1. A computer-implemented method for discovering fabric devices, comprising:
    receiving a list from a fabric driver of fabric devices available to a host system, wherein the fabric driver is part of an operating system for the host system;
    receiving a request to select a subset of the fabric devices from the list;
    requesting the fabric driver to create an operating system device node in the host system for each of the fabric devices in the subset not already online, wherein each operating system device node provides a mechanism for accessing a corresponding one of the subset of fabric devices through the operating system executing on the host system; and
    creating the operating system device node in the host system for each of the fabric devices in the subset not already online, and wherein said creating the operating system device node comprising writing the operating system device node into a memory.

2. The method as recited in claim 1, further comprising, prior to said receiving a request to select a subset of the fabric devices from the list:
    displaying the list of fabric devices available to the host system.

3. The method as recited in claim 1, further comprising, prior to said receiving a list:
    requesting the fabric driver to provide the list of fabric devices available to the host system in response to user input.

4. A method for discovering fabric devices, comprising:
    providing a list of fabric devices available to a host system;
    receiving a request to create operating system device nodes in the host system for each fabric device in a selected subset of the fabric devices available to the host system; and
    creating an operating system device node in the host system for each of the fabric devices in the selected subset not already online, wherein each operating system device node provides a mechanism for accessing a corresponding one of the subset of fabric devices through an operating system executing on the host System, and wherein said creating the operating system device node comprising writing the operating system device node into a memory.

5. The method as recited in claim 4, further comprising, prior to said providing a list of fabric devices:
    querying a fabric nameserver for information about the fabric devices;
    receiving the information about the fabric devices from the nameserver; and
    compiling the list of fabric devices available to the host system.

6. The method as recited in claim 5, wherein said compiling the list comprises:
    from the information about the fabric devices, selecting the fabric devices supporting one protocol out of a plurality of protocols supported on the fabric; and
    compiling the list of fabric devices to list only those fabric devices supporting said one protocol.

7. The method as recited in claim 6, wherein said one protocol is SCSI over Fibre Channel.

8. The method as recited in claim 4, wherein the list comprises address information to address the fabric devices through the fabric.

9. A method for discovering devices attached to a storage network, comprising:
    receiving a request to identify devices attached to the storage network which are available to a host system;
    requesting the storage network to identify devices attached to the storage network which are available to the host system;
    receiving a list of the identified devices;
    receiving a request to on-line a subset of the identified devices; and
    creating an operating system device node within the host system for each of the identified devices in the subset that is not already online, wherein each operating system device node provides a mechanism for accessing a corresponding one of the subset of the identified devices through an operating system executing on the host system and wherein said creating the operating system device node comprising writing the operating system device node into a memory.

10. The method as recited in claim 9, wherein the storage network comprises a fabric, and wherein the host system comprises a plurality of ports to the fabric, wherein said request to identify devices attached to the storage network which are available to a host system is for devices available to the host system through a specified one of the ports, and wherein said requesting the storage network to identify devices is made for the specified port.

11. The method as recited in claim 9, wherein the storage network comprises a fabric, and wherein the host system comprises a plurality of ports to the fabric, wherein said request to identify devices attached to the storage network which are available to a host system is for devices available to the host system through a specified set of the ports, and wherein said requesting the storage network to identify devices is made for the specified set of the ports.

12. The method as recited in claim 9, further comprising, for each device successfully brought online for the host system by said creating an operating system device node, updating a persistent repository to indicate which devices are currently online.

13. The method as recited in claim 12, further comprising:
    receiving from the storage network a notification that a device is no longer available; and
    updating the persistent repository to reflect that the unavailable device is offline.

14. The method as recited in claim 12, further comprising:
in response to a reboot of the host system:
reading the persistent repository; and
onlining the devices indicated by the persistent repository to have been onlined prior to the reboot.

15. The method as recited in claim 9, wherein the storage network comprises a Fibre Channel switched fabric comprising a plurality of Fibre Channel switches.

16. A host system, comprising:
one or more adapter ports for connecting to a fabric;
a tangible computer readable storage medium, encoded with program instructions computer-executable to implement:
a fabric driver configured to interface the host system to the fabric, wherein the fabric driver is part of an operating system for the host system;
an application configured to request the fabric driver to provide a list of fabric devices attached to the fabric that are visible to the host system through one of said adapter ports;
wherein the fabric driver is further configured to provide the list of fabric devices to the application in response to the request from the application;
wherein the application is further configured to indicate to the fabric driver a selected subset of the fabric devices from the list to be brought online for access from the host system; and
wherein the fabric driver is further configured to online the selected subset of fabric devices so that the selected subset of fabric devices are accessible from the host system, wherein the fabric driver is further configured to create operating system device nodes within the host system for each device of the selected subset, wherein each operating system device node provides a mechanism for accessing a corresponding one of the subset of fabric devices through the operating system executing on the host system.

17. The host system as recited in claim 16, wherein the application is further configured to:
display the list to a user through a user interface; and
provide through the user interface for the user to select devices from the list as the selected subset of the fabric device to be brought online.

18. The host system as recited in claim 16, wherein, in response to the request from the application, the fabric driver is further configured to:
query a fabric nameserver for information about the fabric devices to compile the list;
wherein the nameserver maintains information identifying devices accessible throughout the fabric.

19. The host system as recited in claim 18, wherein the fabric driver is further configured to:
receive the information about the fabric devices from the nameserver;
from the information about the fabric devices, select the fabric devices supporting one protocol out of a plurality of protocols supported on the fabric; and
return the list of fabric devices to the application, wherein the list of fabric devices is a list of devices supporting said one protocol.

20. The host system as recited in claim 19, wherein said one protocol is SCSI over Fibre Cannel.

21. The host system as recited in claim 16, wherein the list comprises address information to address the fabric devices through the fabric.

22. The host system as recited in claim 16, wherein the application is further configured to make said request to the fabric driver for a specified one of the one or more adapter ports.

23. The host system as recited in claim 16, wherein the application is further configured to make said request to the fabric driver for a specified set of the one or more adapter ports.

24. The host system as recited in claim 16, further comprising:
a plurality of I/O ports including the one or more adapter ports for connecting to a fabric; and
a device discovery mechanism configured to:
determine whether each of the I/O ports is connected to one or more direct attach devices or to the fabric;
for each of the I/O ports connected to one or more direct attach devices, discover the one or more direct attach devices and create an operating system node for accessing each direct attach device; and
for each of the I/O ports connected to the fabric, designate the I/O port as a fabric port without attempting to discover the fabric devices.

25. The host system as recited in claim 24, wherein said discovery mechanism is configured to execute in response to a reboot of the host system, and wherein said application is configured to execute on the host system subsequent to said reboot and discovery process.

26. The host system as recited in claim 24, wherein each of the I/O ports connected to the fabric comprises a Fibre Channel host adapter port.

27. The host system as recited in claim 24, wherein each of the I/O ports connected to one or more direct attach devices comprises a port to a Fibre Channel private loop or point-to-point link.

28. The host system as recited in claim 24, wherein:
said discovery mechanism is configured to determine whether each of the I/O ports is connected to one or more direct attach devices or to the fabric by attempting to log-in to the fabric through each I/O port;
wherein if the log-in fails, said discovery mechanism is configured to designate the I/O port as a direct-attach port; and
if the log-in is successful, designate the I/O port as a fabric port.

29. The host system as recited in claim 24, further comprising a library configured to provide an interface between said application and said fabric driver, wherein the library is configured to update a persistent repository for each fabric device successfully brought online for the host system to indicate which devices are currently online.

30. The host system as recited in claim 29, wherein the library is further configured to:
receive from the fabric driver a notification that a fabric device is no longer available; and
update the persistent repository to reflect that the unavailable fabric device is offline.

31. The host system as recited in claim 29, wherein the discovery mechanism is further configured to, in response to a reboot of the host system:
read the persistent repository; and
request the fabric driver to online the devices indicated by the persistent repository to have been onlined prior to the reboot.

32. The host system as recited in claim 16, wherein the fabric comprises a Fibre Channel switched fabric comprising a plurality of Fibre Channel switches.

33. The host system as recited in claim 16, wherein the fabric is part of a storage area network (SAN), and wherein the fabric devices comprise storage devices.

34. The host system as recited in claim 16, wherein the fabric driver comprises:
   a Fibre Channel protocol module configured to perform SCSI protocol operations between the host system and the fabric; and
   one or more Fibre Channel port drivers configured to perform transport layer operations between the host system and the fabric;
   wherein the Fibre Channel protocol module and the one or more Fibre Channel port drivers are part of an operating system kernel on the host system.

35. A computer readable storage medium having stored thereon data representing sequences of instructions, wherein the sequences of instructions are executable by one or more processors to implement:
   receiving a list from a fabric driver of fabric devices available to a host system, wherein the fabric driver is part of an operating system for the host system;
   receiving a request to select a subset of the fabric devices from the list;
   requesting the fabric driver to create an operating system device node in the host system for each of the fabric devices in the subset not already online,
wherein each operating system device node provides a mechanism for accessing a corresponding one of the subset of fabric devices through the operating system executing on the host system; and
   creating the operating system device node in the host system for each of the fabric devices in the subset not already online, and wherein said creating the operating system device node comprising writing the operating system device node into a memory.

36. The computer readable storage medium as recited in claim 35, wherein said receiving a list, said selecting a subset, and said requesting the fabric driver to online the selected subset, are performed through an application executing on the host system.

37. The computer readable storage medium as recited in claim 35, wherein the program instructions are further configured to implement, prior to said receiving a request to select a subset of the fabric devices from the list:
   displaying the list of fabric devices available to the host system.

38. The computer readable storage medium as recited in claim 35, wherein the program instructions are further configured to implement, prior to said receiving a list:
   requesting the fabric driver to provide the list of fabric devices available to the host system in response to user input.

39. A computer readable storage medium having stored thereon data representing sequences of instructions, wherein the sequences of instructions are executable by one or more processors to implement:
   providing a list of fabric devices available to a host system;
   receiving a request to create operating system device node in the host system for each fabric device in a selected subset of the fabric devices available to the host system; and
   creating an operating system device node in the host system for each of the fabric devices in the selected subset not already online, wherein each operating system device node provides a mechanism for accessing a corresponding one of the subset of fabric devices through an operating system executing on the host system, and wherein said creating the operating system device node comprising writing the operating system device node into a memory.

40. The computer readable storage medium as recited in claim 39, wherein the program instructions are further configured to implement, prior to said providing a list of fabric devices:
   querying a fabric nameserver for information about the fabric devices;
   receiving the information about the fabric devices from the nameserver; and
   compiling the list of fabric devices available to the host system.

41. The computer readable storage medium as recited in claim 40, wherein said compiling the list comprises:
   from the information about the fabric devices, selecting the fabric devices supporting one protocol out of a plurality of protocols supported on the fabric; and
   compiling the list of fabric devices to list only those fabric devices supporting said one protocol.

42. The computer readable storage medium as recited in claim 41, wherein said one protocol is SCSI over Fibre Channel.

43. The computer readable storage medium as recited in claim 39, wherein the list comprises address information to address the fabric devices through the fabric.

44. A computer readable storage medium having stored thereon data representing sequences of instructions, wherein the sequences of instructions are executable by one or more processors to implement:
   receiving a request to identify devices attached to storage network which are available to a host system;
   requesting the storage network to identify devices attached to the storage network which are available to the host system;
   receiving a list of the identified devices;
   receiving a request to on-line a subset of the identified devices; and
   creating an operating system device node within the host system for each of the identified devices in the subset that is not already online, wherein each operating system device node provides a mechanism for accessing a corresponding one of the subset of the identified devices through an operating system executing on the host system; and
wherein said creating the operating system device node comprising writing the operating system device node into a memory.

45. The computer readable storage medium as recited in claim 44, wherein the storage network comprises a fabric, and wherein the host system comprises a plurality of ports to the fabric, wherein said request to identify devices attached to the storage network which are available to a host system is for devices available to the host system through a specified one of the ports, and wherein said requesting the storage network to identify devices is made for the specified port.

46. The computer readable storage medium as recited in claim 44, wherein the storage network comprises a fabric, and wherein the host system comprises a plurality of ports to the fabric, wherein said request to identify devices attached to the storage network which are available to a host system is for devices available to the host system through a specified set of the ports, and wherein said requesting the storage network to identify devices is made for the specified set of the ports.

47. The computer readable storage medium as recited in claim 44, wherein the program instructions are further configured to implement, for each device successfully brought online for the host system by said creating an operating system device node, updating a persistent repository to indicate which devices are currently online.

48. The computer readable storage medium as recited in claim 47, wherein the program instructions are further configured to implement:
   receiving from the storage network a notification that a device is no longer available; and
   updating the persistent repository to reflect that the unavailable device is offline.

49. The computer readable storage medium as recited in claim 47, wherein the program instructions are further configured to implement:
   in response to a reboot of the host system:
      reading the persistent repository; and
      onlining the devices indicated by the persistent repository to have been onlined prior to the reboot.

50. The computer readable storage medium as recited in claim 44, wherein the storage network comprises a Fibre Channel switched fabric comprising a plurality of Fibre Channel switches.

51. The computer readable storage medium as recited in claim 44, wherein the storage network is part of a storage area network (SAN), and wherein the devices comprise storage devices.

52. A method for discovering fabric devices, comprising:
   viewing a list of fabric devices available to a host system;
   selecting a subset of the fabric devices from the list; and
      requesting that each of the fabric devices in the subset be brought online if not already online for use from the host system, wherein each fabric device that is online has a corresponding operating system device node that provides a mechanism for accessing a corresponding one of the subset of the identified devices through an operating system executing on the host system;
   creating an operating system device node in the host system for each of the fabric devices in the subset not already online, and wherein said creating the operating system device node comprising writing the operating system device node into a memory; and
   wherein said viewing, selecting and requesting are performed via a computer system user interface.

53. The method as recited in claim 52, further comprising, prior to said viewing a list:
   requesting the list of fabric devices available to the host system.

* * * * *